US007657251B2

(12) United States Patent (10) Patent No.: US 7,657,251 B2
Okabe (45) Date of Patent: Feb. 2, 2010

(54) CALL INTERRUPTION COMPENSATION SYSTEM

(75) Inventor: Toshiya Okabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/064,045

(22) Filed: Feb. 23, 2005

(65) Prior Publication Data

US 2005/0221815 A1 Oct. 6, 2005

(30) Foreign Application Priority Data

Mar. 31, 2004 (JP) ............................. 2004-103639

(51) Int. Cl.
*H04M 1/725* (2006.01)
(52) U.S. Cl. .................................. 455/412.1; 455/413
(58) Field of Classification Search ................. 455/403, 455/412, 1, 412.2, 413, 414.1, 412.1, 417, 455/563, 569.2, 466, 567, 7, 8, 9, 11.1, 15, 455/18; 704/235; 379/211.01, 211.02, 212.01
See application file for complete search history.

(56) References Cited

U.S. PATENT DOCUMENTS

| 4,837,797 | A * | 6/1989 | Freeny, Jr. ............... 379/93.17 |
| 5,365,450 | A * | 11/1994 | Schuchman et al. ....... 455/456.3 |
| 7,245,612 | B2 * | 7/2007 | Petty et al. .................. 370/356 |
| 2003/0134617 | A1 * | 7/2003 | Duerk et al. ................ 455/412 |
| 2004/0116138 | A1 * | 6/2004 | Greenspan et al. .......... 455/501 |
| 2004/0186636 | A1 * | 9/2004 | Mendelson et al. ............. 701/9 |
| 2004/0203607 | A1 * | 10/2004 | Satapathy .................. 455/412.1 |
| 2004/0235483 | A1 * | 11/2004 | Sylvain ....................... 455/445 |
| 2005/0031344 | A1 * | 2/2005 | Sato et al. ..................... 398/42 |
| 2006/0019650 | A1 * | 1/2006 | Kedem ....................... 455/422.1 |

FOREIGN PATENT DOCUMENTS

| JP | 58-047366 | 3/1983 |
| JP | 3-278663 | 10/1991 |
| JP | 9-11663 | 5/1997 |
| JP | 09-116630 | 5/1997 |
| JP | 9-252487 | 9/1997 |
| JP | 09-252487 | 9/1997 |
| JP | 3056117 | 4/2000 |
| JP | 2000-165523 | 6/2000 |
| JP | 171342/02 | 6/2002 |

* cited by examiner

*Primary Examiner*—Patrick N Edouard
*Assistant Examiner*—Anthony S Addy
(74) *Attorney, Agent, or Firm*—Scully, Scott, Murphy & Presser, P.C.

(57) ABSTRACT

A mobile terminal prompts a user to make a voice message upon detection of an abnormally interrupted call, and records the message. Then, the mobile terminal converts the recorded voice data and a telephone number of a communication partner's terminal into a format suitable for data communication. Next, the mobile terminal transmits the converted data to a mobile data communication relay base station. The mobile data communication relay base station forwards the converted data to a data communication network storage device via a data communication network. A stored message transmitter retrieves the telephone number of the communication partner's terminal from the data communication network storage device and calls the communication partner's terminal via a fixed telephone network. When communication is established between the stored message transmitter and the communication partner's terminal, the stored message transmitter reproduces the voice data retrieved from the data communication network storage device in response to a request from the communication partner's terminal.

5 Claims, 2 Drawing Sheets

CALL INTERRUPTION COMPENSATION SYSTEM

BACKGROUND OF THE INVENTION

1. Field of the Invention

The present invention relates to a communication service for use when a call is abnormally interrupted.

2. Description of the Related Art

When a mobile telephone is used in a traveling vehicle such as a car, a train, or the like, a call can be abnormally interrupted halfway due to an increased distance from a base station, or interference by an obstruction. An inconvenience is therefore imposed on the user who has been talking over the telephone because the user cannot complete the telephone conversation.

To eliminate this inconvenience, Japanese Patent No. 3056117 and Japanese Patent Laid-Open Publication No. 171342/02 each have proposed a method of incorporating a voice recording function into the exchanger of a mobile telephone network or the exchanger of a fixed telephone network.

Both Japanese Patent No. 3056117 and Japanese Patent Laid-Open Publication No. 171342/02 simply propose a method for a user who does not experience a faulty communication incident to leave a message with a user who experiences a faulty communication incident. As long as a telephone call is a bi-directional communication, there should be a method for a user who experiences a faulty communication incident to leave a message with a user who does not experience a faulty communication incident.

SUMMARY OF THE INVENTION

It is an object of the present invention to provide a method of communicating a message from a user who experiences a faulty communication to a user who does not experience a faulty communication.

To achieve the above object, the present invention provides a call interruption compensation system which includes a mobile terminal, a data communication relay station installed in a vehicle or a building for wireless communication with the mobile terminal, a data communication network storage device for receiving data from the data communication relay station via a data communication network, and a stored message transmitter connected to the data communication network storage device for communication with a communication partner's terminal connected to a mobile telephone terminal or a fixed telephone terminal.

In the call interruption compensation system as described above, the mobile terminal, upon detection of an abnormally interrupted call in a vehicle or a building, prompts the user of the mobile terminal to make a voice message and records the message. Next, the mobile terminal converts the recorded voice data and telephone number data of the communication partner's terminal into a format suitable for data communication. Next, the mobile terminal transmits the converted data to the data communication relay station.

The data communication relay station connects to the data communication network by wire or wireless access to transmit the converted data received from the mobile terminal to the data communication network storage device via the data communication network. The stored message transmitter, which is connected to the data communication network storage device, retrieves the telephone number data of the communication partner's terminal from the data communication network storage device, and calls the communication partner's terminal via the mobile telephone network or fixed telephone network. As a communication is established between the stored message transmitter and the communication partner's terminal, the stored message transmitter reproduces the voice data retrieved from the data communication network storage device in response to a request from the communication partner's terminal, thereby making it possible to communicate the message from the user who experiences a faulty communication incident to the user who does not experience a faulty communication incident.

In addition to the ability to achieve the above object, as described above, the present invention provides the following advantages. In the present invention, the data communication relay station is installed in a vehicle or a building to transmit voice data via a different route than the route made up of the mobile terminal—the mobile telephone network—(the fixed telephone network)—the communication partner's terminal. Therefore, even if the mobile terminal has not recovered from faulty communication via the mobile telephone network, a recorded message can be communicated to the communication partner's terminal provided that communication can be made between the data communication relay station and the data communication network storage device.

The above and other objects, features and advantages of the present invention will become apparent from the following description with reference to the accompanying drawings, which illustrate examples of the present invention.

DETAILED DESCRIPTION OF THE PREFERRED EMBODIMENTS

Figure 1:
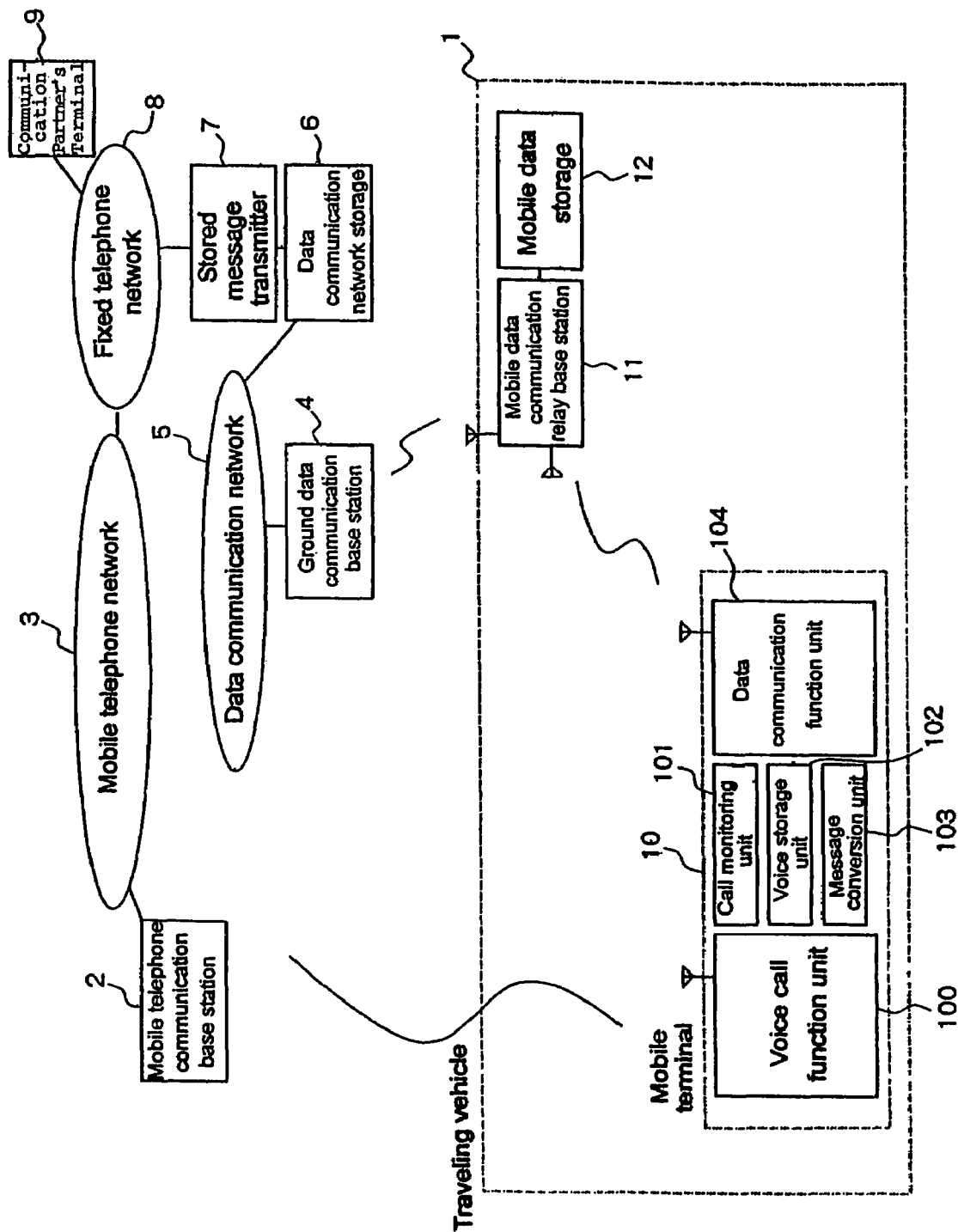
FIG. 1 is a block diagram illustrating the configuration of a call interruption compensation system according to one embodiment of the present invention.

Referring to FIG. 1, a call interruption compensation system according to one embodiment of the present invention comprises mobile terminal 10 owned by a user in traveling vehicle 1 including a car and a train; mobile data communication relay base station 11 installed in traveling vehicle 1 for permitting mobile terminal 10 to wirelessly connect thereto; and mobile data storage device 12 connected to mobile data communication relay base station 11. The system further comprises mobile telephone communication base station 2 to which mobile terminal 10 wirelessly connects; mobile telephone network 3 to which mobile telephone communication base station 2 is connected; ground data communication base station 4 to which mobile data communication relay base station 11 wirelessly connects; data communication network 5 to which ground data communication base station 4 is connected; data communication network storage device 6 connected to data communication network 5; stored message transmitter 7 connected to data communication network storage device 6; fixed telephone network 8 to which stored message transmitter 7 is connected; and communication partner's terminal 9 connected to fixed telephone network 8. Mobile telephone network 3 and fixed telephone network 8 are connected to each other.

Mobile terminal 10 comprises voice call function unit 100, call monitoring unit 101, voice storage unit 102, message conversion unit 103, and data communication function unit 104. Mobile terminal 10 has a communication means suitable for voice communications conforming to such standards as PDC (Personal Digital Cellular), GSM (Global System for Mobile communications), W-CDMA (Wideband-Code Division Multiple Access), and the like, and also has a communication means suitable for data communications represented by wireless LAN (Local Area Networks) such as IEEE802.11b, IEEE802.11g, IEEE802.11a, and the like.

Voice call function unit 100 provides the user of mobile terminal 10 with a voice call function. Call monitoring unit 101 monitors voice call function unit 100 for an interrupted call. Voice storage unit 102 temporarily stores a voice of the user of mobile terminal 10 after call monitoring unit 101 detects an interrupted call.

Message conversion unit 103 converts voice data stored in voice storage unit 102 into a format suitable for data communication. Data communication function unit 104 transmits the voice data (including telephone number data of communication partner's terminal 9), which is converted into a format suitable for data communication by message conversion unit 103, to mobile data communication relay base station 11. Mobile data communication relay base station 11 temporarily stores the voice data received from data communication function unit 104 in mobile data storage device 12. Mobile data storage device 12 temporarily stores the voice data received by mobile data communication relay base station 11. Mobile data storage device 12 transmits the voice data to data communication network storage device 6 via mobile data communication relay base station 11, ground data communication base station 4 installed on the ground, and data communication network 5.

Mobile telephone communication base station 2 makes wireless communications with mobile terminal 10 in conformity with such standards as PDC, GSM, W-CDMA, and the like. Mobile telephone network 3, which is connected to fixed telephone network 8, enables communications between mobile terminal 10 and communication partner's terminal 9 connected to fixed telephone network 8.

Ground data communication base station 4 is installed, for example, along a railway line or a road. Ground data communication base station 4 transmits voice data received from mobile data communication relay base station 11 to data communication network storage device 6 via data communication network 5. Data communication network 5 enables data communications between mobile data storage device 12 and data communication network storage device 6. Data communication network storage device 6, upon receipt of voice data from mobile data storage device 12, stores the received voice data, and notifies stored message transmitter 7 that voice data has been received. Also, data communication network storage device 6, upon receipt of a request from communication partner's terminal 9, sequentially transmits stored voice data to stored message transmitter 7.

Upon receipt of a notification from data communication network storage device 6 informing that voice data has been received, stored message transmitter 7 calls communication partner's terminal 9 through fixed telephone network 8 to notify that there is a voice message. Upon receipt of a request from communication partner's terminal 9, stored message transmitter 7 receives voice data transferred from data communication network storage device 6, and reproduces a voice for communication partner's terminal 9.

Fixed telephone network 8 enables a call between mobile terminal 10 and communication partner's terminal 9, and enables communications between stored message transmitter 7 and communication partner's terminal 9. Communication partner's terminal 9 is a terminal which is used by the partner who is called from mobile terminal 10.

Figure 2:
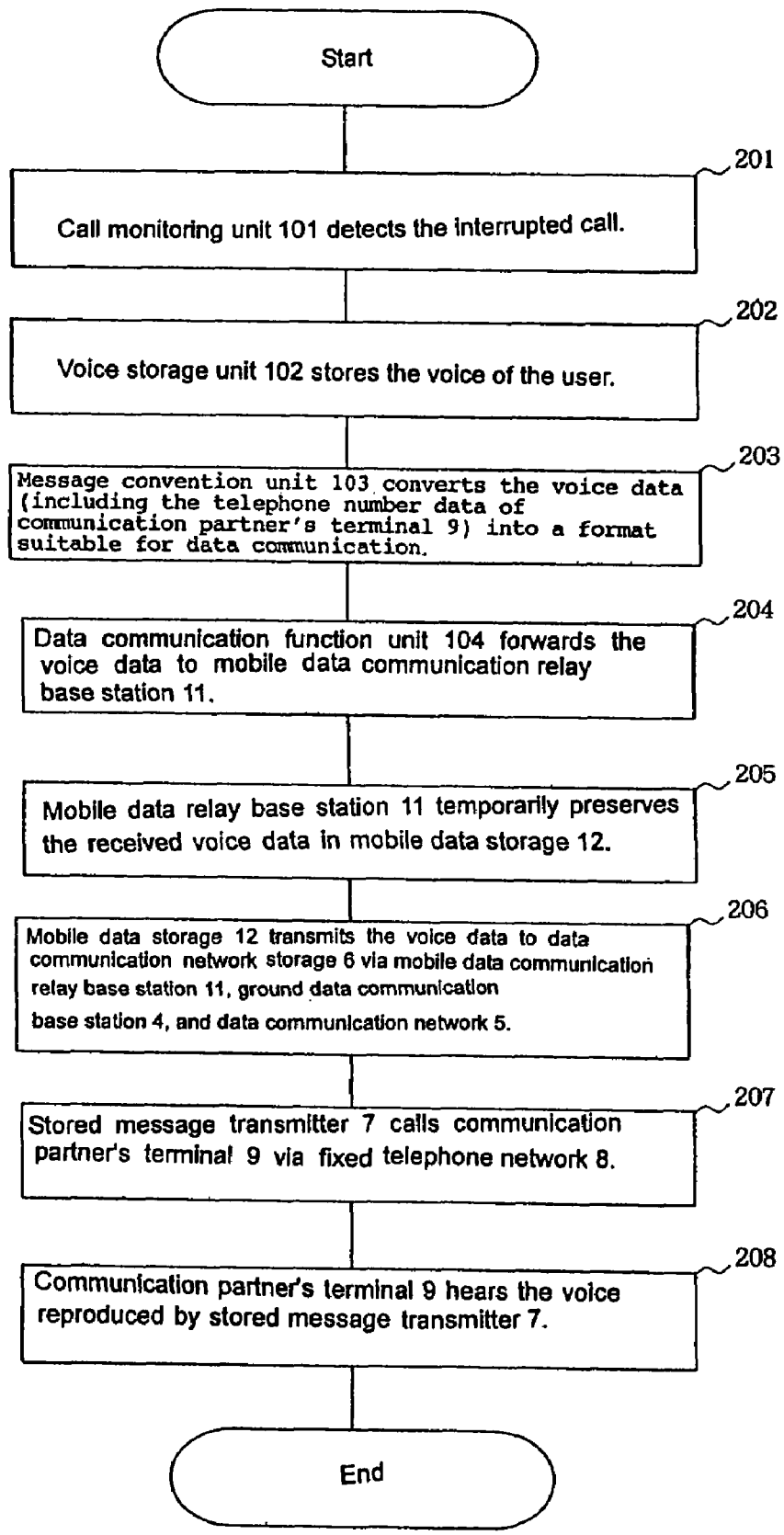
FIG. 2 is a flow chart illustrating the operation of the call interruption compensation system in FIG. 1.

Next, the operation of the call interruption compensation system according to this embodiment will be described in detail with reference to a flow chart of FIG. 2.

Assume that a call is interrupted for some reason when mobile terminal 10 is in voice communication with communication partner's terminal 9 via mobile telephone communication base station 2, mobile telephone network 3, and fixed telephone network 8.

At step 201, call monitoring unit 101, which is monitoring voice call function unit 100, detects the interrupted call. Call monitoring unit 101 notifies the user of mobile terminal 10 that the call has been interrupted with the aid of beep sound, announcement, or the like, and instructs voice storage unit 102 to start storing a voice.

At step 202, upon receipt of the instruction to start storing a voice, voice storage unit 102 starts storing the voice of the user of mobile terminal 10 in order to save the voice for a predefined time. After the lapse of the predefined time, voice storage unit 102 sends the saved voice data to message conversion unit 103. In this event, voice storage unit 102 also sends telephone number data of communication partner's terminal 9 to message conversion unit 103.

At step 203, message conversion unit 103 converts the voice data into a format suitable for data communication, for example, by dividing the voice data every 10 milliseconds, and sends the converted voice data to data communication function unit 104.

At step 204, data communication function unit 104 forwards the voice data to mobile data communication relay base station 11. In this event, data communication function unit 104 simultaneously forwards the telephone number data of communication partner's terminal 9.

At step 205, mobile data relay base station 11 temporarily saves the received voice data and telephone number data of communication partner's terminal 9 in mobile data storage device 12.

At step 206, if wireless communication is possible between mobile data communication relay base station 11 and ground data communication base station 4 (communication can be made between mobile data communication relay base station 11 and ground data communication base station 4 even if communication is broken off between mobile terminal 10 and mobile telephone communication base station 2), mobile data storage device 12 transmits the voice data and telephone number data to data communication network storage device 6 via mobile data communication relay base station 11, ground data communication base station 4, and data communication network 5. Data communication storage device 6 notifies stored message transmitter 7 that new data has been stored.

At step 207, stored message transmitter 7 receives the telephone number data associated with the newly stored voice data from data communication network storage device 6, and calls communication partner's terminal 9 via fixed telephone network 8.

At step 208, communication partner's terminal 9 receives the incoming call. Because communication partner's terminal 9 is taken off the hook, stored message transmitter 7 reproduces the voice data stored in data communication network storage device 6 for communication partner's terminal 9. The user of communication partner's terminal 9 can hear the latest saved message.

After hearing the message, the user of communication partner's terminal 9 instructs data communication network storage device 6 to save or delete the message by operating the terminal dial keys. Data communication network storage device 6 saves or deletes the stored message based on the manipulations of the dial keys made by the user of communication partner's terminal 9.

The following modifications can be made to the call interruption compensation system of this embodiment.

When there is a message from the user of mobile terminal 10 after a voice call was interrupted, communication partner's terminal 9 may be notified that there is a message by such means as an electronic mail and the user of communication partner's terminal 9 can hear the saved message by specified manipulation of the dial keys (calling a specified telephone number, or the like) which will cause the message to be reproduced.

Stored message transmitter 7 connects to fixed telephone network 8 to call communication partner's terminal 9 via fixed telephone network 8, but when communication partner's terminal 9 is a mobile terminal, stored message transmitter 7 is connected to mobile telephone network 3 to call communication partner's terminal 9 via mobile telephone network 3.

When a voice call is abnormally interrupted, a message may be stored in mobile terminal 10, so that when the connection environment of mobile terminal 10 has recovered, mobile terminal 10 may be automatically connected to mobile telephone network 3 to transfer the message to communication partner's terminal 9. This alternative function does not need data communication network 5, ground data communication base station 4, mobile communication base station 11, mobile data storage device 12, or data communication function unit 104, but can be implemented by providing mobile telephone network 3 with a function unit equivalent to data communication network storage device 6 and stored message transmitter 7.

While data communication network 5 is separate from mobile telephone network 3, these networks may be integrated into a single network. Likewise, while ground data communication base station 4 is separate from mobile telephone base station 2, a single base station may be used for both purposes.

While the foregoing embodiment has been described on the assumption that a mobile terminal is used in a traveling vehicle, the present invention can be fully applied in the same manner when a mobile terminal is used, for example, in a building (because the phone is carried by a person who moves within the building, a call can be interrupted). In this case, the connection is not limited to wireless communication, but may be made by wired communication between mobile data communication relay base station 11 which is installed in a building and ground data communication base station 4.

The components of the call interruption compensation system, particularly, the mobile terminal, are not exclusively implemented by dedicated hardware, but may be implemented by recording a program for carrying out functions thereof on a computer readable recording medium, and by loading the program recorded on the recording medium into a computer which executes the program to provide the functions of the components. Computer readable recording media refer to recording media such as a floppy disk, a magneto-optical disk, CD-ROM, and the like, and storage devices such as a hard disk drive built in a computer system. Further, the computer readable recording media also include an item which dynamically executes a program for a short time period, and an item which holds a program for a predefined time period such as a volatile memory within a computer system.

While preferred embodiments of the present invention have been described using specific terms, such description is for illustrative purposes only, and it is to be understood that changes and variations may be made without departing from the spirit or scope of the following claims.

What is claimed is:

1. A call interruption compensating method for use with a call interruption communication system which includes a mobile terminal, a data communication relay station installed in a vehicle or a building for wireless communication with said mobile terminal, a data communication network storage device for receiving data from said data communication relay station via a data communication network, and a stored message transmitter connected to said data communication network storage device for communication with a communication partner's terminal connected to a mobile telephone terminal or to a fixed telephone terminal, for communicating a message of the user of said mobile terminal to the user of said communication partner's terminal when a call with said communication partner's terminal is abnormally interrupted due to a faulty communication associated with said mobile terminal, said method comprising the steps of:

prompting the user of said mobile terminal to make a message, and recording the message as recorded voice data when an abnormal interruption of a call is detected in the vehicle or the building by means of said mobile terminal;

converting the recorded voice data and a telephone number data of said communication partner's terminal into a format suitable for data communication by means of said mobile terminal, as converted data;

transmitting the converted data to said data communication relay station by said mobile terminal;

connecting to said data communication network by wired or wireless access to transmit the converted data to said data communication network storage device via said data communication network by means of said data communication relay station;

retrieving the telephone number data of said communication partner's terminal from said data communication network storage device, and calling said communication partner's terminal via a mobile telephone network or via a fixed telephone network by means of said stored message transmitter; and reproducing voice data retrieved from said data communication network storage device in response to a request from said communication partner's terminal by means of said stored message transmitter.

2. A call interruption compensation system comprising:

a mobile terminal for prompting a user to make a voice message and recording the message upon detecting an abnormally interrupted call within a vehicle or a building, converting the recorded voice message and a telephone number data of a communication partner's terminal into a format suitable for data communication as converted data, and wirelessly transmitting the converted data;

a data communication relay station installed in the vehicle or the building for receiving the converted data from said mobile terminal, and transmitting the converted data to a data communication network through a wireless or a wired connection to said data communication network;

a data communication network storage device for receiving the converted data from said data communication relay station via said data communication network; and a stored message transmitter connected to said data communication network storage device for retrieving the telephone number data of said communication partner's terminal from said data communication network storage device, calling said communication partner's terminal by a mobile telephone network or by a fixed telephone network, and reproducing voice data retrieved from said data communication network storage device in response to a request from said communication partner's terminal.

3. A mobile terminal comprising:

means for detecting an abnormally interrupted call within a vehicle or a building;

means for prompting a user to make a voice message and recording the message upon detecting an abnormally interrupted call;

means for converting the recorded voice message and a telephone number data of a communication partner's terminal into a format suitable for data communication as converted data;

means for connecting to a data communication network to transmit the converted data to a data communication network storage device by means of a data communication relay station, said data communication network storage device is remotely located from the mobile terminal and remotely located from the communication partner's terminal; and means for transmitting the converted data to the data communication relay station installed in the vehicle or the building, said data communication relay station is located in the same vehicle or the same building as the mobile terminal, wherein the data communication network transmits the recorded speech data to the communication partner's terminal using the telephone number data stored in the data communication network storage device.

4. A computer program product readable by a computer, tangibly embodying a program of instructions executable by the computer for causing the computer which serves as a mobile terminal to execute the steps of:

detecting an abnormally interrupted call within a vehicle or a building;

prompting a user to make a voice message in response to the detection of an abnormally interrupted call, and recording the voice message;

converting the recorded voice message and a telephone number data of a communication partner's terminal into a format suitable for data communication, as converted data; and transmitting the converted data to a data communication relay station installed in the vehicle or the building, said data communication relay station is located in the same vehicle or the same building as the mobile terminal, said data communication relay station relays said converted data to a data communication network storage device for storage, said data communication network storage device is remotely located from the mobile terminal and remotely located from the communication partner's terminal wherein a communication network transmits the recorded speech data to the communication partner's terminal using the telephone number data stored in the data communication network storage device.

5. A computer readable recording medium having a computer readable program for causing a computer which serves as a mobile terminal to execute the steps of:

detecting an abnormally interrupted call within a vehicle or a building;

prompting a user to make a voice message in response to the detection of an abnormally interrupted call, and recording the voice message;

converting the recorded voice message and a telephone number data of a communication partner's terminal into a format suitable for data communication, as converted data; and transmitting the converted data to a data communication relay station installed in the vehicle or the building, said data communication relay station is located in the same vehicle or the same building as the mobile terminal, said data communication relay station relays said converted data to a data communication network storage device for storage, said data communication network storage device is remotely located from the mobile terminal and remotely located from the communication partner's terminal wherein a communication network transmits the recorded speech data to the communication partner's terminal using the telephone number data stored in the data communication network storage device.

* * * * *